US006453733B1

(12) United States Patent
Malaczynski et al.

(10) Patent No.: US 6,453,733 B1
(45) Date of Patent: Sep. 24, 2002

(54) METHOD OF IDENTIFYING COMBUSTION ENGINE FIRING SEQUENCE WITHOUT FIRING SPARK PLUGS OR COMBUSTING FUEL

(75) Inventors: Gerard Wladyslaw Malaczynski, Bloomfield Hills; Peter Hull Maehling, Brighton; Mark L. Lott, Milford, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/659,387

(22) Filed: Sep. 11, 2000

(51) Int. Cl.⁷ ............................................. G01M 15/00
(52) U.S. Cl. .................................................... 73/116
(58) Field of Search ........................ 73/35.01, 35.03, 73/35.04, 35.06, 35.07, 35.08, 116, 117.2, 117.3

(56) References Cited

U.S. PATENT DOCUMENTS

| | | | | |
|---|---|---|---|---|
| 5,065,729 A | * | 11/1991 | Krauter et al. | 73/115 |
| 5,355,713 A | * | 10/1994 | Scourtes et al. | 73/117.2 |
| 5,388,560 A | * | 2/1995 | Hisaki et al. | |
| 5,418,461 A | * | 5/1995 | Maeda et al. | 73/117.3 |
| 5,526,788 A | * | 6/1996 | Noble et al. | 73/35.03 |
| 5,687,082 A | * | 11/1997 | Rizzoni | 73/117.3 |
| 5,933,009 A | * | 8/1999 | Kayser | 73/117.3 |
| 6,029,631 A | * | 2/2000 | Jiewertz et al. | 73/116 |

* cited by examiner

Primary Examiner—Eric S. McCall
(74) Attorney, Agent, or Firm—Vincent A. Cichosz (57) ABSTRACT

A method and apparatus for the precombustion identification of a cylinder undergoing compression in an internal combustion engine is disclosed. An electrode gap (e.g., preferably a spark plug) is disposed within a cylinder of an internal combustion engine. The electrode gap is provided with a voltage differential from a power supply through a circuit (preferably an RC circuit). The engine is cranked, and the voltage differential across the electrode gap is monitored during the cranking of the engine. With appropriate choices of the voltage differential across the electrode gap, the resistance R of the circuit, and the capacitance C of the circuit, voltage pulses are produced across the electrode gap during such time when the cylinder is not undergoing a compression stroke. Such voltage pulses are suppressed when the cylinder is in fact undergoing a compression stroke due to a rise in the breakdown voltage across the electrode gap, in accordance with Paschen's Law. The presence or absence of the voltage pulses is preferably converted into a binary output that is indicative of the occurrence of a compression stroke in the cylinder being monitored.

26 Claims, 5 Drawing Sheets

METHOD OF IDENTIFYING COMBUSTION ENGINE FIRING SEQUENCE WITHOUT FIRING SPARK PLUGS OR COMBUSTING FUEL

FIELD OF THE INVENTION

The invention relates generally to a method and apparatus for identifying a cylinder undergoing a compression stroke in an internal combustion engine. More particularly, the invention pertains to a method and apparatus for rapidly identifying a compression cylinder of an internal combustion engine during startup of the engine, in order to establish a proper ignition timing sequence.

BACKGROUND OF THE INVENTION

The following background information is provided to assist the reader to understand the invention described and claimed herein. Accordingly, any terms used herein are not intended to be limited to any particular narrow interpretation unless specifically so indicated.

A cylinder of a typical internal combustion engine undergoes four different sequential strokes during a single complete cycle of the engine: an intake stroke, a compression stroke, a combustion (or "power") stroke, and an exhaust stroke. The spark plug of a particular cylinder is typically fired/actuated at some point near the end of the compression stroke (e.g., at a certain number of degrees before top dead center of the compression stroke is reached). This is typically termed the amount by which the spark is "advanced", and allows for a certain amount of lag time required for the combusting fuel to spread and therefore supply sufficient power to the particular piston. The combustion stroke then follows, in which the piston is forcibly moved toward the crankshaft by the expanding combusting gas. During these four strokes, there are two strokes in which the piston of each cylinder is moving in a direction away from the crankshaft: the compression stroke and the exhaust stroke.

During an initial startup, where the internal combustion engine is being powered by a typically electrically powered motor (e.g., a "starter motor" powered by the battery of the vehicle), it is important to identify which pistons of the internal combustion engine are undergoing the compression stroke, so that the correct spark plug wire (or "harness" wire) may be energized by the ignition coil so as to fire the appropriate spark plug at the top (or near top dead center, minus advancement) of the cylinder(s) which are undergoing a compression stroke.

Earlier internal combustion engines did not require that the particular cylinder (or cylinders) undergoing a compression stroke be identified during the startup process, since mechanical linkages between a "distributor" (e.g., via a "rotor") and the camshaft always assured that a spark would be applied to the correct cylinder(s) (e.g., those undergoing a compression stroke).

More modern internal combustion engines have eliminated the distributor and rotor arrangement, and thus correct identification of the cylinder(s) undergoing a compression stroke during startup is a necessity, in order that a correct timing sequence of firing the cylinders can be established.

DESCRIPTION OF THE RELATED ART

Various methods and apparatuses have been utilized and proposed in order to correctly and efficiently identify compression cylinders during the startup procedure of an internal combustion engine and thus initialize a correct timing sequence.

A camshaft sensor has been used for compression cylinder identification. Since the camshaft controls the opening and closing of the intake and exhaust ports for the various cylinders, the rotational positioning of the camshaft uniquely identifies which cylinders are undergoing a compression stroke and allows for correct initiation of the firing sequence.

Thus, in such schemes, the camshaft position sensor's signal is used by engine control module (typically a microprocessor) to fire the desired cylinder. Such camshaft rotational positioning sensors can prove expensive, however, both in materials cost and in the cost of installation. Moreover, failure of such a part during the life of the engine, can give rise to a costly repair.

Another example of compression cylinder identification is described in U.S. patent application Ser. No. 09/972,824, entitled "Method of Identifying Engine Cylinder Combustion Sequence Based on Combustion Quality" and filed on Oct. 5, 200 which relates to a so-called "Ion Sense" system of cylinder identification. Here, the spark plugs of all cylinders are actually fired during the startup procedure. At the same time, the spark plugs are used as sensors for measuring the ionization occurring at subsequent cylinders during the actual combusting of the fuel/air mixture during startup. From this ionization feedback, it is possible to determine which of the various cylinders are actually undergoing compression, and thus initiate a proper firing sequence of the spark plugs. Once the cylinder identification is accomplished, the firing continues in the sequential mode, and the "Ion Sense" system thereafter monitors combustion quality, detecting irregularities like misfires and engine knock.

The California Air Resources Board (or "CARB") is requiring misfire detection with no delay at start beginning with the year 2001. "Start" is defined under this standard as the engine reaching within 150 RPM of the hot stabilized idle RPM. For a currently employed "Ion Sense" algorithm, for room temperature starts, the delay is <0.5 sec. Therefore, the CARB requirement is not met for the first 0.5 sec.

OBJECTIVES OF THE INVENTION

Accordingly, one objective of the invention is the provision of a method and apparatus for rapidly identifying a cylinder undergoing compression in an internal combustion engine in order to initiate a correct ignition timing sequence.

Another objective is the provision of a method and apparatus for compression cylinder identification that does not require costly sensors for detecting the angular positioning of either the camshaft or the crankshaft of the engine.

A still further objective of the invention is the provision of a method and apparatus for precombustion cylinder identification wherein it is not necessary to either actually fire the spark plugs of the engine or to supply a fuel/air mixture to the cylinders of the engine during the period of time before the correct timing sequence of the engine is acquired. This is in contrast to the above-described "Ion Sense" method of timing sequence acquisition. In the present invention, the cylinder identification takes place either substantially instantaneously or requires, at most, one full engine cycle (i.e., two crankshaft revolutions). During such time, a fuel/air mixture need not be supplied to the cylinders. That is, during cylinder identification according to the present invention, there is no actual combustion of fuel and firing of the spark plugs is unnecessary.

Yet another object of the invention is the provision of a method and apparatus for cylinder identification which is inexpensively implemented and repaired, and which is reliable in operation.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

In one aspect, the invention generally features a method for identifying a time during which a cylinder of an internal combustion engine is undergoing a compression stroke. The method includes the following steps: An electrode gap is provided and is disposed within the cylinder of the internal combustion engine. A power supply is provided, and the electrode gap is supplied with a voltage differential from the power supply through a circuit. The internal combustion engine is cranked, and the voltage differential across said electrode gap is monitored to determine whether pulses are present in the voltage differential across the electrode gap during such time when the electrode gap is being supplied with the voltage differential and internal combustion engine is being cranked. Preferably, a spark plug, which would normally be installed in the cylinder, furnishes the electrode gap.

In another aspect, the invention generally features an apparatus for identifying a time during which a cylinder of an internal combustion engine is undergoing a compression stroke. The apparatus includes an electrode gap disposed substantially within the cylinder of the internal combustion engine, a power supply, a circuit supplying the electrode gap with a voltage differential from the power supply, and a monitoring circuit for monitoring the voltage differential across the electrode gap to determine whether pulses are present in the voltage differential across the electrode gap during a time when the electrode gap is being supplied with the voltage differential from the power supply and the internal combustion engine is being cranked. Preferably, a spark plug, which would normally be installed in the cylinder, furnishes the electrode gap.

DETAILED DESCRIPTION OF THE INVENTION

Figure 1:
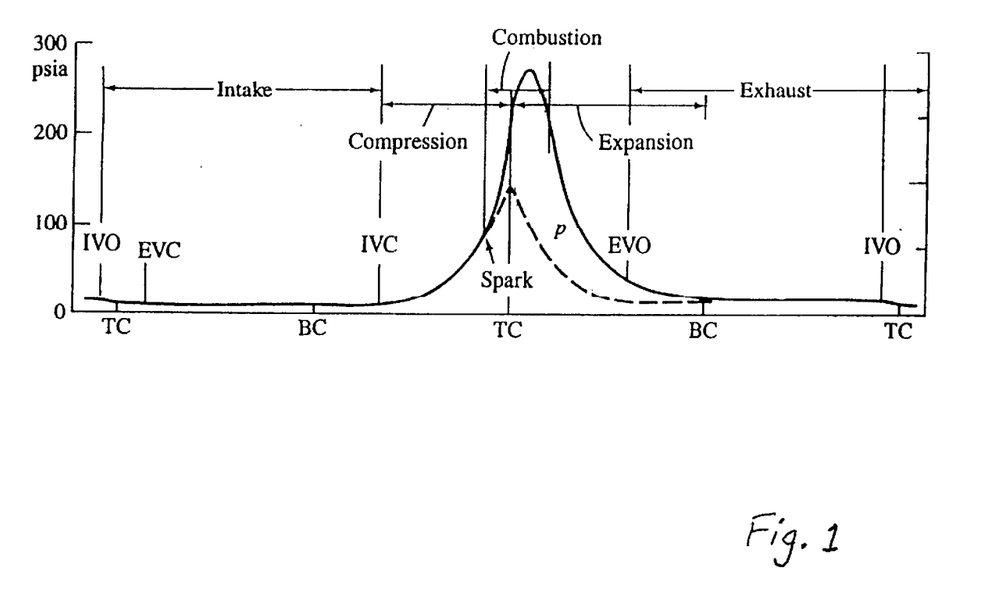
FIG. 1 is a time graph of a typical single cylinder of an internal combustion engine, wherein the pressure existing within the cylinder extends along the ordinate of the graph and the timings of various events are shown as extending along the abscissa of the graph.

FIG. 1 is a time line of a cylinder of a typical internal combustion engine showing the occurrence of the various strokes (intake, compression, combustion, and exhaust) and the corresponding internal pressure of the cylinder. The various openings and closings of the intake and exhaust valves are shown (e.g., "IVC" indicating a closing of the "intake valve(s)). The dashed line represents the motored cycle cylinder pressure, that is, the pressure during startup when the internal combustion engine is being driven by a starter motor and the combustion event is absent. It will be seen that there is a significant rise in the internal pressure of the cylinder occurs during startup when the cylinder undergoes a compression stroke. The present invention is directed to detecting this rise in cylinder pressure during such a compression stroke.

Figure 2:
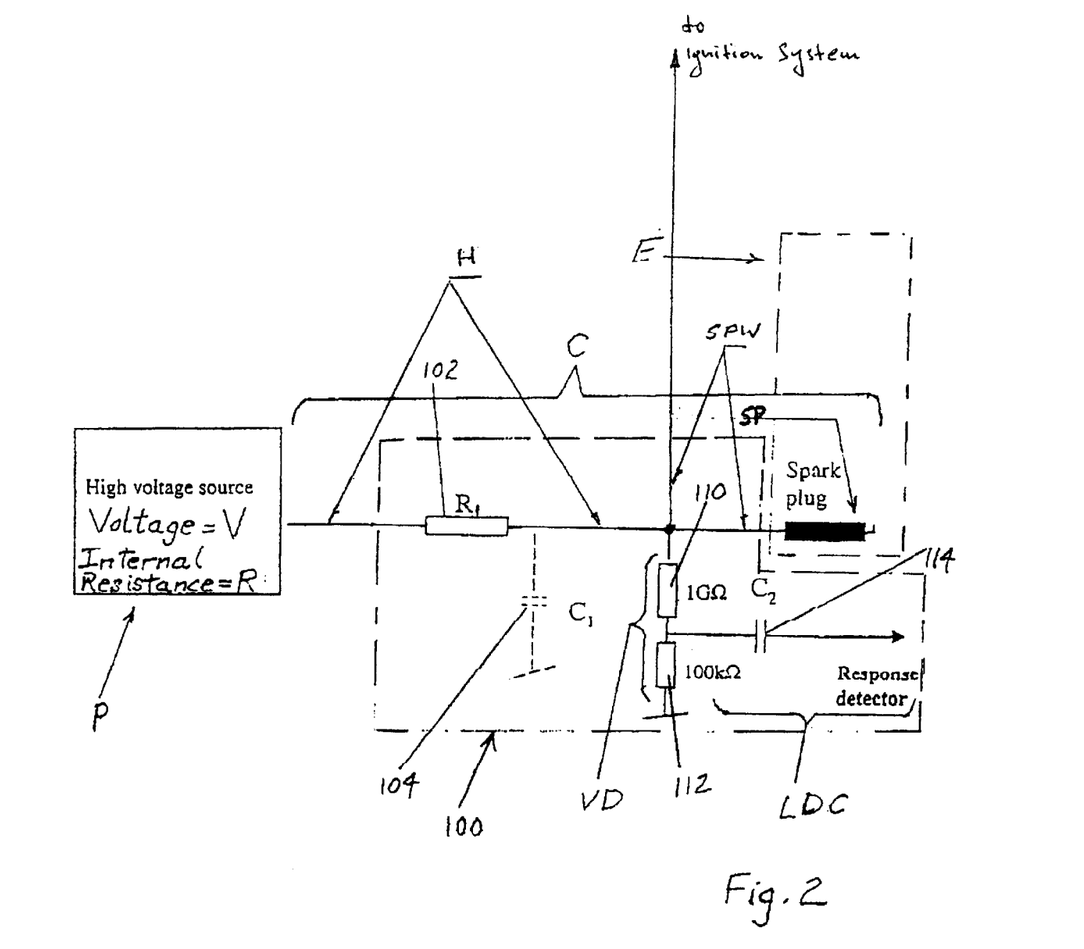
FIG. 2 is a schematic view of a compression cylinder identification circuit according to a first embodiment of the invention for a six cylinder engine, wherein the compression cylinder identification circuit is provided to monitor only a single spark plug wire of the six cylinder engine.
Figure 3:
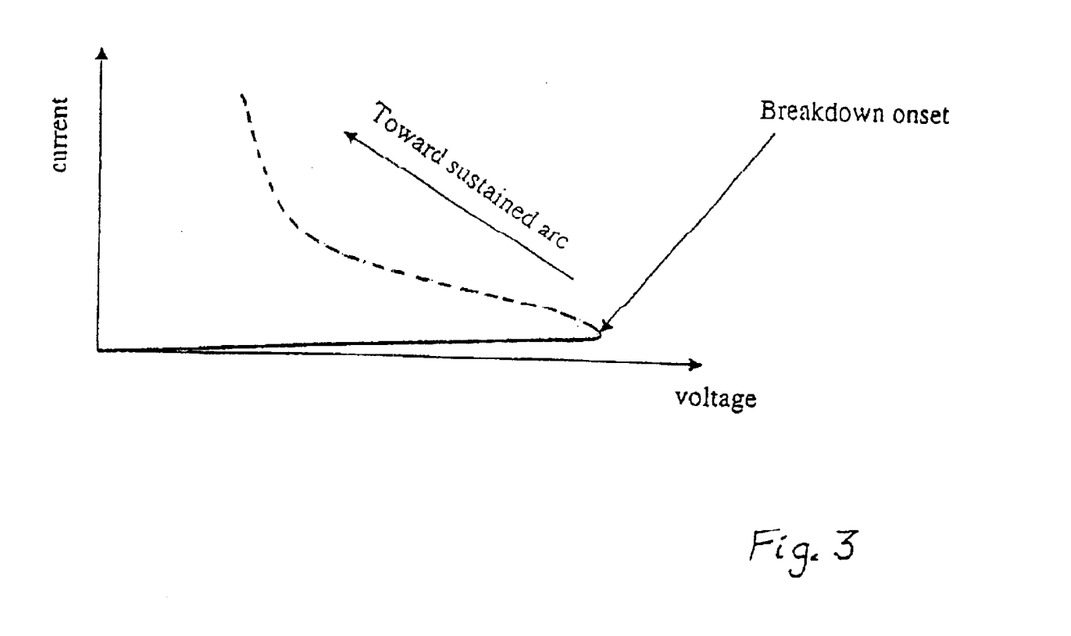
FIG. 3 is graph of current vs. voltage across a typical electrode gap (such as a spark plug), showing the point at which breakdown of the electrode gap begins and the voltage and current parameters which would lead from gap breakdown to the establishment of a sustained arc across the electrode gap.

FIG. 2 shows a first embodiment of the invention for detecting this rise in cylinder pressure during a compression stroke, preferably in the absence of combustion. A high voltage power supply P is routed during a startup of an internal combustion engine E to supply a high voltage V (typically on the order of 3 kV to 8 kV) through a spark plug wire SPW of a wiring harness H to a spark plug SP. The spark plug SP is mounted within a cylinder of the internal combustion engine E. In the exemplary preferred embodiments specifically discussed herein, a six cylinder engine is used as an example. It will, however, be readily understood that the invention has equal applicability to engines having other numbers of total cylinders (e.g., four cylinders, eight cylinders, etc.).

The spark plug wire SPW is provided with a compression cylinder identification circuit 100, described more fully below. In the first embodiment of the invention illustrated in FIG. 2, only one of the spark plug wires SPW of, for example, a six cylinder engine is provided with the compression cylinder identification circuit 100. Since a compression stroke occurs once in each cylinder during every two crankshaft revolutions, this first embodiment of the invention requires, at most, two revolutions of the crankshaft before a correct timing sequence can be established. In a second alternative embodiment discussed below, more than one single wiring harness H is provided with the compression cylinder identification circuit 100, and the maximum time required to establish a correct timing sequence is correspondingly reduced.

The present inventors have discovered that the lower portion of the 3 kV to 8 kV voltage range for the high voltage power supply P appears preferable for normal ambient temperature and pressure conditions likely to be encountered. The desired voltage range, however, can be easily adjusted. It must be noted that the voltage range selection is critical for the system reliability and is determined by the range of available spark plug types, the contamination that a particular spark plug is likely to incur in service, and spark plug gap settings (i.e., the distance between the electrodes of the spark plug), which may depart from standard gap settings but still provide tolerable combustion sparks.

Preferably, the high voltage power supply P is a "soft" high voltage power supply, in the sense that it has a high internal resistance illustrated in FIG. 2 as an internal resistance R. Alternatively, if a so-called "hard" high voltage power supply P is employed, an equivalent resistance $R_1$ (emulating the internal resistance R depicted in FIG. 2) may be supplied in the form of a separate discrete external resistor element 102 having a resistance equal to $R_1$. One example of a "soft" high voltage power supply P which may be preferably employed in the invention would be in the form of a mechanically actuated piezoelectric element, which can supply high voltages at very low current levels (which is here a desired characteristic) for limited periods of time. Since an internal combustion engine during startup has numerous moving mechanical parts, excitation of the piezoelectric element in order to generate the resulting high voltage V may be accomplished by numerous mechanical stimuli, well understood by those of ordinary skill in the electromechanical arts.

The spark plug SP and the associated spark plug wire SPW and the detector's wiring harness H together have a stray capacitance equal to C. Most of this capacitance C is contributed by the spark plug SP itself. Typically, spark plug capacitance, depending on the brand name, varies between about 5 and about 10 pF (i.e., Pico farads or $10^{-12}$ farads). Therefore, the total capacitance of the spark plug SP, the spark plug wire SPW, and the harness H is typically less than 15 pF. Just as the internal resistance of the power supply P can be adjusted upward by the addition of an external resistor of resistance R, the natural internal combined capacitance of the spark plug SP spark plug wire SPW, and the harness H can be adjusted upward by the addition of an external capacitor 104 having a capacitance of $C_1$. Preferably, however, no correcting external capacitive element 104 is introduced, since it would unnecessarily increase the requirement for the electric power from the high voltage power supply P. The total resistance R (or $R+R_1$) and the total capacitance C (or $C+C_1$) forms an RC circuit wherein the resistance R (or $R+R_1$) and the capacitance C (or $C+C_1$) are connected in series. The time required to charge the capacitance C (or $C+C_1$) with the high voltage V can be adjusted by varying the values of R (or $R+R_1$) and C (or $C+C_1$), according to the formula: Time Constant=R*C. For example, if the resistance R=100 Mohm (and, therefore, the maximum current which can be drained from the 5 kV voltage source is equal to 5 kV/100 Mohm=0.05 mA), the time constant for a 12 pF capacitance typically represented by the spark plug SP plus the spark plug wire SPW plus the harness H is: 100 Mohms*12 pF=1.2 msec. This time represents only a small fraction of the cranking cycle during the time period when the engine E is being motorized (i.e., cranked) by the starter motor. The present inventors have discovered that, by proper proportioning of the resistance R and capacitance C of the spark plug SP, spark plug wire SPW, and the harness H (in other words, the total resistance R and the total capacitance C from the high voltage power supply P through the spark plug SP), a phenomena known generally as "Paschen's Law" can be utilized to quickly and accurately determine when the cylinder within which the spark plug SP located is currently undergoing compression stroke during the startup routine (i.e., motorized operation, for example, powered by the starter motor). The present invention, therefore, allows for a quick and efficient initialization of the proper timing sequence of the cylinders, and does not require an actual firing of the spark plugs or the introduction of a fuel/air mixture, which may then pass uncombusted into the ambient environment.

Paschen's Law, in brief and simplified form, states that the breakdown characteristics of a gap between electrodes are a function (generally not linear) of the product of the gas pressure and the gap length. Paschen's Law is usually expressed as V=f(pd), where p is the pressure, d is the gap distance, and V is the electric breakdown onset voltage. More accurately, it is the gas density and not the gas pressure which is determinative. By "breakdown onset" is meant the threshold electric field conditions at which electrons liberated in the gas create an avalanche effect, and the electrode gap resistance changes almost instantly from a very high value (close to infinity) to a very low value (close to zero). The present inventors have utilized the fact that, by an appropriate choice of values for V, R, and C, for a given typical spark plug SP, operating under a normal ambient temperature and pressure likely to be encountered, an oscillating voltage can be produced across the electrode gap of the spark plug SP (and in the spark plug wire SPW and the harness H) when the particular associated engine cylinder is not undergoing a compression stroke.

An oscillating voltage is produced in a spark plug wire circuit SPW and the harness H due to the fact that the capacitance C of the spark plug SP plus the spark plug wire SPW and harness H is supplied through the resistor R with the current attempting to charge it to the full voltage V, for example 5 kV. However, if the electric breakdown onset for the uncompressed air in the particular associated cylinder is lower than this 5 kV, then, before the 5 kV can be reached, the resistivity of the spark plug gap collapses to zero and the capacitor C is discharged across the spark plug gap with the time constant equal to the product of [C*resistance of the spark plug gap], which is much less than the charging resistance, and most likely in the range of ohms instead of Mohms. Consequently, a discharging of the capacitor C occurs almost instantly (and typically in much less time than the calculated time charging constant of 1.2 msec). The voltage then collapses to the level below the breakdown, since the current supplied from the power source is limited. Due to the absence of the necessary electric charge in the capacitor C, the current conduction across the ionized air gap of the spark plug SP is terminated. This restores the substantially infinite resistance of the air gap, and the capacitor C begins charging again with the time constant 1.2 msec. In effect, oscillations are produced which can be observed on an oscilloscope.

Figure 4:
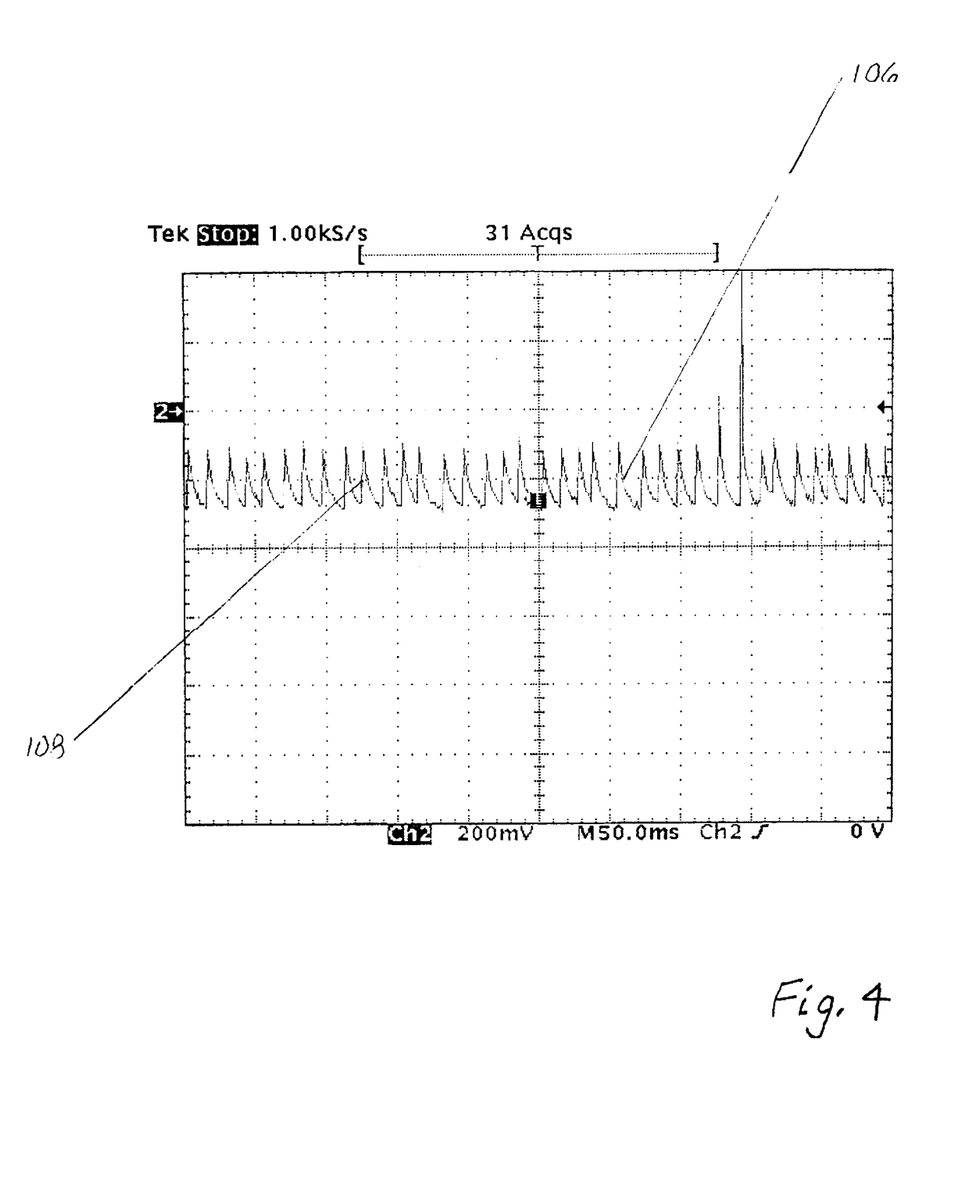
FIG. 4 is a printout of an oscilloscope trace, showing the voltage differential produced, according to the invention, across a spark plug electrode gap when the spark plug is positioned in a cylinder not undergoing a compression stroke. As explained more fully below, according to the present invention, voltage oscillations, such as those appearing in FIG. 4, are produced in the detection circuits of cylinders that are currently not undergoing a compression stroke. Conversely, the type of voltage oscillations depicted in FIG. 4 are suppressed in cylinders that are undergoing a compression stroke (i.e., cylinders having a relatively elevated internal pressure).

A typically saw-tooth form of oscillations produced by this phenomena is illustrated in FIG. 4. The rising slope (more negative voltage) identified by reference numeral 106 represents the time constant RC, while the subsequent collapse to the level below the breakdown threshold (less negative voltage) identified by reference numeral 108 is practically instantaneous (i.e., nearly vertical) at the selected oscilloscope time scale (50 msec/cm). Conversely, if the associated cylinder for the particular spark plug wire SPW is undergoing a compression stroke, the oscillating voltage characteristic shown in FIG. 4 will be absent, since the selected voltage V (and thus maximum voltage to which the capacitor C can be charged) is chosen to be lower than the onset breakdown voltage for the compressed air existing within the particular cylinder. In such a case (i.e., a compression stroke in the relevant cylinder), the capacitor C will be charged to the full voltage V and the capacitor C will retain this electric charge until such time as the air pressure of the relevant cylinder is significantly reduced during a later portion of the cranking cycle. When the air pressure of the relevant cylinder is reduced during such a subsequent portion of the cranking cycle, the voltage oscillations will then be produced in the spark plug wire SPW of the relevant cylinder. The presence or absence of the oscillating voltage characteristic can be readily and inexpensively converted into a logical data signal (i.e., either a "0" or a "1"), which can then be provided as input to a logic circuit in order to initialize a proper firing sequence upon the startup of an internal combustion engine.

Stated another way, the "time constant" product of the resistance R and capacitance C for the spark plug SP, spark plug wire SPW, and the harness H determines the time rate at which the voltage is built up across the electrodes of the associated spark plug SP. If the particular associated cylinder is not undergoing a compression stroke, there will be a relatively low pressure existing in that particular cylinder. In such case, with appropriate choices for V, R, and C, the voltage buildup across the capacitance C becomes periodically "quenched" by a conductance of current between the electrodes of the spark plug SP, whereupon the voltage difference is once again built up. FIG. 4 shows the resultant oscillating voltage produced in a spark plug wire SPW under such conditions of relatively low cylinder pressure. In contrast, if a substantially elevated pressure exists in the associated cylinder there will be no oscillations produced, and the voltage level at the capacitor C and the spark plug air gap remains constant. This is in accordance with Paschen's Law; the breakdown voltage is never reached, and consequently, the voltage characteristic for the associated spark plug SP remains at a constant DC level, lacking the oscillating voltage characteristic of FIG. 4.

The oscillations shown in FIG. 4 are produced by a negatively biased voltage source. Therefore, the arrows indicate a zero voltage level. Assuming that the grid is spaced at 1 cm (not exactly to scale in FIG. 4) and that 1 cm=2 kV, the onset level of gap breakdown occurs at approximately 3 kV, and arcing across the electrode gap ceases once the voltage collapses to approximately 1 kV. The sharp vertical portion 108 indicates a very low discharging time constant. Once the current is quenched, the charging resumes with a time constant defined by the total resistance R. [The total capacitance C is the same, both for charging and discharging.] It will be seen in FIG. 4 that the maximums and minimums are, to some degree, randomly distributed. This is the result of uncontrollable factors. Nevertheless, Paschen's Law shows a solid correlation with the real life phenomenon. The correlation creates a sawtooth wave bounded by the breakdown onset defined by Paschen's Law and by the quenching effect at the other end, which is defined by the selection of the electric circuit components and by some uncontrollable factors contributing to the statistical distribution of the precise point when the electric discharge is terminated.

The RC circuit which includes the total resistance R (or R+$R_1$) and the total capacitance C (or C+$C_1$) forms a portion of the compression cylinder identification circuit 100, which monitors any selected cylinders to determine the times at which the selected cylinders are undergoing a compression stroke.

In the first embodiment of the invention shown in FIG. 2, only one of the six cylinders (or four, or eight, depending on the number of engine cylinders present) is provided with the compression cylinder identification circuit 100. In this first embodiment, an oscillating signal is produced in the compression cylinder identification circuit 100 of the one particular cylinder being monitored throughout the cranking period up until the moment when that cylinder undergoes a compression stroke. At that point in the cranking cycle, the oscillations in the associated spark plug wire SPW cease, and the particular cylinder being monitored is identified as being under compression at that particular moment. In the worst possible scenario (which depends on the initial piston and valve positioning at the beginning of engine startup), the first embodiment of the invention illustrated in FIG. 2 may require up to two full engine cranking cycles (i.e., up to two full crankshaft revolutions) before compression cylinder identification is acquired. From the perspective of the CARB definition, compression cylinder identification which is established within two full crankshaft revolutions is considered to be "instantaneous".

Figure 5:
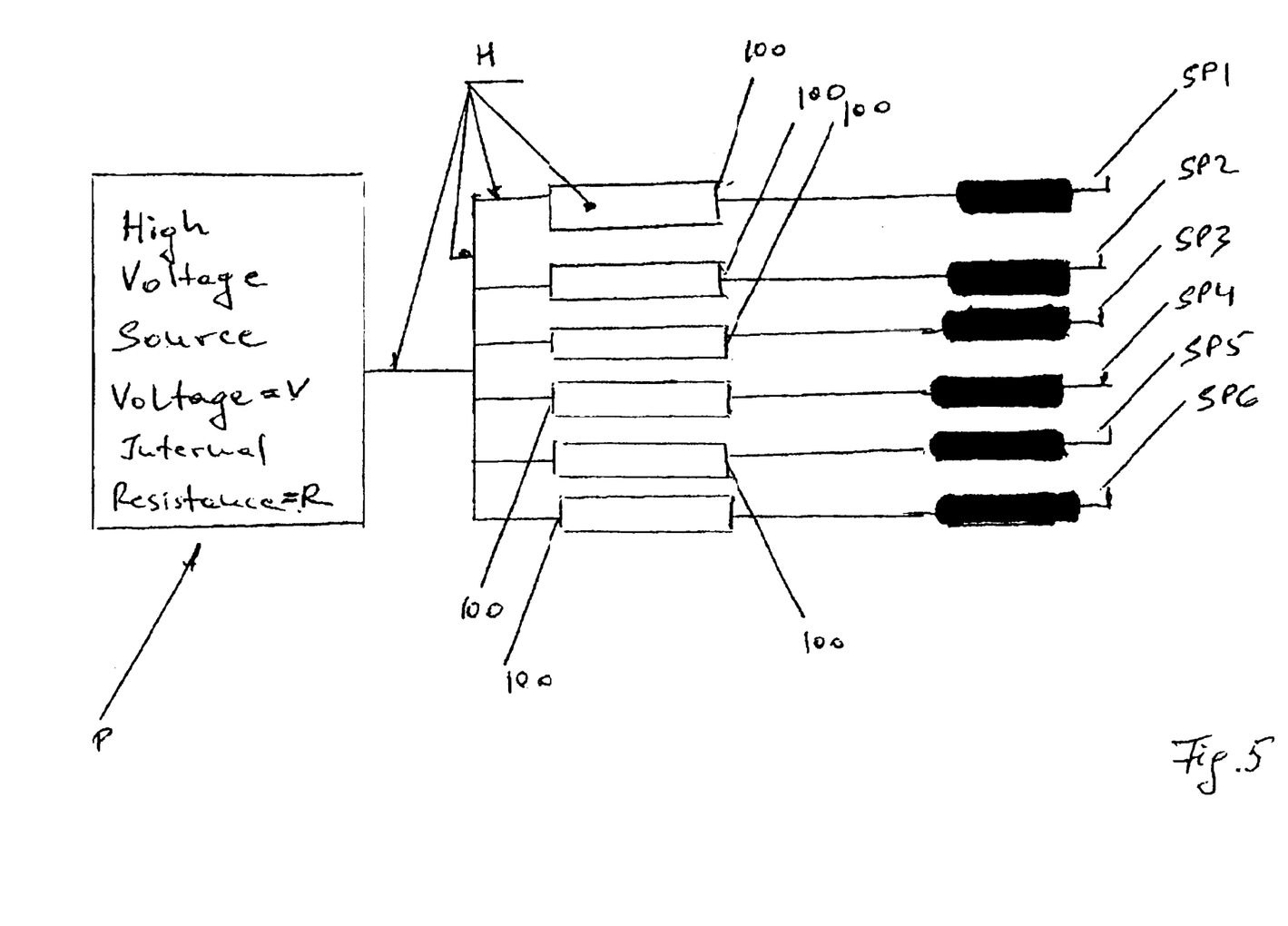
FIG. 5 is a schematic view of a compression cylinder identification circuit according to a second and alternative embodiment of the invention for a six cylinder engine, wherein a compression cylinder identification circuit is provided to monitor more than a single spark plug wire of the six cylinder engine.

In a second embodiment of the invention illustrated in FIG. 5, more than one of the engine cylinders (for example, all of the engine cylinders) are provided with the compression cylinder identification circuit 100. One out of the six (or four, or eight, depending on the number of engine cylinders present) compression cylinder identification circuits 100 will lack voltage oscillations, while, at the same time, the compression cylinder identification circuit 100 associated with each of the remaining cylinders will exhibit voltage oscillations. Accordingly, in a relatively instantaneous manner, the cylinder that is undergoing compression can be identified by the lack of voltage oscillations in the associated compression cylinder identification circuit 100.

The compression cylinder identification circuit 100 additionally includes a voltage divider circuit VD and a logical detection circuit LDC. The voltage divider circuit VD includes two resistors 110 and 112 and reduces the voltage existing at the spark plug SP down to acceptable levels for the logical detection circuit LDC. The logical detection circuit LDC utilizes a capacitor 114 having a capacitance of $C_2$ to allow only the AC component of the signal to pass through. Consequently, the logical detection circuit LDC will have a logical output of 0 (no signal, since only a DC component is present) when the associated cylinder is under compression, and a logical output of 1 (AC signal) when the associated cylinder is not under compression. Accordingly, from the output of the logical detection circuit LDC, an initial firing sequence can be quickly and reliably established.

In preliminary investigations, the following presently preferred values have been established:

Spark Plug Model No.: The invention is compatible with substantially all models, all suppliers, and both old and new spark plugs.

V Voltage of Power Source P: Preferably 3 kV to 6 kV. 7.5 kV was enough to sustain oscillations at 75 psi with a nominal spark plug gap distance.

Power Source: A so-called "soft" power source is preferably employed, which could be piezoelectric.

Resistance R (or R+$R_1$): Preferably in tens of Mohms in order to secure a desirable amplitude and frequency of oscillations.

Capacitance C (or C+$C_1$): An external capacitor C1 is preferably not employed in order to minimize costs. The spark plug SP and the associated harness preferably provides any desired capacitance.

Voltage Divider Circuit VD: The voltage divider must prevent voltage leakage to the ground. Therefore, the total resistance provided by the two resistors in series 110 and 112 must be preferably in the high Mohm range. Also, in order to charge the capacitance C, the cumulative resistance of the voltage divider must be greater than the charging resistance R. Note also, that V*V/[R(110)+R(112)] defines the electric power consumed by the current leak and needs to be limited to a minimum. The ratio of resistors 110 and 112 in the voltage divider VD reflects the desired voltage output amplitude. For example, if the power source P provides 5 kV and the desired level of the DC component at the output is 1 V, the ratio is 1/5000. Thus, for an upper leg of the voltage divider VD equal to 500 Mohms (i.e., resistor 110), the lower leg of the voltage divider VD (i.e., resistor 112) is set to 100 Kohms.

Detector Capacitor 114: The detector capacitor 114 having a capacitance of $C_2$ is a typical coupling capacitor having no special requirements.

While the present invention has been disclosed by way of a detailed description of a number of particularly preferred embodiments, it will be clear to those of ordinary skill in the art that various substitutions of equivalents can be effected without departing from either the spirit or scope of the invention as set forth in the appended claims.

What is claimed is:

1. A method for identifying a time during which a cylinder of an internal combustion engine is undergoing a compression stroke, said method comprising the steps of:
   (a) providing an electrode gap and disposing said electrode gap substantially within said cylinder of said internal combustion engine;
   (b) providing a power supply;
   (c) supplying said electrode gap with a voltage differential generated by said power supply through a circuit;
   said voltage differential supplied to said electrode gap being of a sufficient magnitude to:
      1) create a breakdown onset condition across said electrode gap when said cylinder is not undergoing said compression stroke;
      2) prevent a breakdown onset condition across said electrode gap when said cylinder is undergoing said compression stroke; and
      3) prevent the generation of an actual spark condition across said electrode gap;
   (d) cranking said internal combustion engine; and
   (e) monitoring said electrode gap to determine the presence or absence of said breakdown onset condition across said electrode gap during said steps of a) supplying said electrode gap with said voltage differential and b) cranking said internal combustion engine;
   the absence of said breakdown onset condition across said electrode gap indicating that said cylinder is undergoing said compression stroke; and
   the presence of said breakdown onset condition across said electrode gap indicating that said cylinder is not undergoing said compression stroke.

2. A method for identifying a time during which a cylinder of an internal combustion engine is undergoing a compression stroke, according to claim 1, wherein said electrode gap disposed substantially within said cylinder of said internal combustion engine comprises a spark plug; and wherein said step (e) additionally comprises the step of monitoring a voltage differential across said electrode gap to determine the presence or absence of oscillations in said voltage differential across said electrode gap, the absence of said oscillations indicating that said cylinder is undergoing said compression stroke, and the absence of said oscillations indicating that said cylinder is not undergoing said compression stroke.

3. A method for identifying a time during which a cylinder of an internal combustion engine is undergoing a compression stroke, according to claim 1, wherein:
   said power supply and said circuit taken together comprise an RC circuit having a substantially total resistance of R and a substantially total capacitance of C.

4. A method for identifying a time during which a cylinder of an internal combustion engine is undergoing a compression stroke, according to claim 3, wherein said circuit comprises at least a wire connection between said power source and said electrode gap.

5. A method for identifying a time during which a cylinder of an internal combustion engine is undergoing a compression stroke, according to claim 4, wherein said circuit additionally comprises an additional discrete resistor component.

6. A method for identifying a time during which a cylinder of an internal combustion engine is undergoing a compression stroke, according to claim 4, wherein said circuit additionally comprises an additional discrete capacitor component having a capacitance substantially equal to $C_1$.

7. A method for identifying a time during which a cylinder of an internal combustion engine is undergoing a compression stroke, according to claim 4, wherein said circuit additionally comprises:
   an additional discrete resistor component; and
   an additional discrete capacitor component having a capacitance substantially equal to $C_1$.

8. A method for identifying a time during which a cylinder of an internal combustion engine is undergoing a compression stroke, according to claim 1, wherein:
   said cylinder has a first cylinder pressure when not undergoing a compression stroke;
   said cylinder has a second cylinder pressure when undergoing a compression stroke, said second cylinder pressure being substantially higher than first cylinder pressure;
   said electrode gap has a first breakdown onset voltage differential at said first cylinder pressure; and
   said electrode gap has a second breakdown onset voltage differential at said second cylinder pressure, said second breakdown onset voltage differential being substantially higher than said first breakdown onset voltage differential;
   and wherein said method additionally comprises the additional step of:
      adjusting said voltage differential supplied to said electrode gap from said power supply to be substantially equal to or greater than said first breakdown onset voltage differential and substantially less than said second breakdown onset voltage differential.

9. A method for identifying a time during which a cylinder of an internal combustion engine is undergoing a compression stroke, according to claim 2, wherein said step e) of monitoring said voltage differential across said electrode gap comprises the steps of:
   converting said voltage differential across said electrode gap to a substantially proportionally reduced voltage differential; and
   converting said substantially proportionally reduced voltage differential to a logical binary value.

10. A method for identifying a time during which a cylinder of an internal combustion engine is undergoing a compression stroke, according to claim 2, wherein:

said internal combustion engine includes N cylinders; and said electrode gap is provided in and said voltage differential across said electrode gap is monitored in at least a plurality of said N cylinders.

11. A method for identifying a time during which a cylinder of an internal combustion engine is undergoing a compression stroke, according to claim 2, wherein:

said internal combustion engine includes N cylinders; and said electrode gap is provided in and said voltage differential across said electrode gap is monitored in each of said plurality of said N cylinders.

12. A method for identifying a time during which a cylinder of an internal combustion engine is undergoing a compression stroke, according to claim 1, wherein said power supply comprises a soft power supply.

13. A method for identifying a time during which a cylinder of an internal combustion engine is undergoing a compression stroke, according to claim 1, wherein said power supply comprises a piezoelectric element.

14. An apparatus for identifying a time during which a cylinder of an internal combustion engine is undergoing a compression stroke, said apparatus comprising:

(a) an electrode gap disposed substantially within such cylinder of such internal combustion engine;

(b) a power supply;

(c) a circuit supplying said electrode gap with a voltage differential generated by said power supply;

said voltage differential supplied to said electrode gap by said circuit being of a sufficient magnitude to:

1) create a breakdown onset condition across said electrode gap when said cylinder is not undergoing said compression stroke;

2) prevent a breakdown onset condition across said electrode gap when said cylinder is undergoing said compression stroke; and 3) prevent the generation of an actual spark condition across said electrode gap; and (d) monitoring circuit means for monitoring the presence or absence of said breakdown onset condition across said electrode gap during a time when said electrode gap is being supplied with said voltage differential from said power supply and said internal combustion engine is being cranked, the absence of said breakdown onset condition across said electrode gap indicating that said cylinder is undergoing said compression stroke; and the presence of said breakdown onset condition across said electrode gap indicating that said cylinder is not undergoing said compression stroke.

15. An apparatus for identifying a time during which a cylinder of an internal combustion engine is undergoing a compression stroke, according to claim 14, wherein said electrode gap disposed substantially within said cylinder of said internal combustion engine comprises a spark plug, and wherein said monitoring circuit means additionally comprises means for monitoring a voltage differential across said electrode gap to determine the presence or absence of oscillations in said voltage differential across said electrode gap, the absence of said oscillations indicating that said cylinder is undergoing said compression stroke, and the absence of said oscillations indicating that said cylinder is not undergoing said compression stroke.

16. An apparatus for identifying a time during which a cylinder of an internal combustion engine is undergoing a compression stroke, according to claim 14, wherein:

said power supply and said circuit taken together comprise an RC circuit having a substantially total resistance of R and a substantially total capacitance of C.

17. An apparatus for identifying a time during which a cylinder of an internal combustion engine is undergoing a compression stroke, according to claim 16, wherein said circuit comprises at least a wire connection between said power source and said electrode gap.

18. An apparatus for identifying a time during which a cylinder of an internal combustion engine is undergoing a compression stroke, according to claim 17, wherein said circuit additionally comprises an additional discrete resistor component.

19. An apparatus for identifying a time during which a cylinder of an internal combustion engine is undergoing a compression stroke, according to claim 17, wherein said circuit additionally comprises an additional discrete capacitor component having a capacitance substantially equal to $C_1$.

20. An apparatus for identifying a time during which a cylinder of an internal combustion engine is undergoing a compression stroke, according to claim 17, wherein said circuit additionally comprises:

an additional discrete resistor component; and an additional discrete capacitor component having a capacitance substantially equal to $C_1$.

21. An apparatus for identifying a time during which a cylinder of an internal combustion engine is undergoing a compression stroke, according to claim 14, wherein:

said cylinder has a first cylinder pressure when not undergoing a compression stroke;

said cylinder has a second cylinder pressure when undergoing a compression stroke, said second cylinder pressure being substantially higher than first cylinder pressure;

said electrode gap has a first breakdown onset voltage differential at said first cylinder pressure; and said electrode gap has a second breakdown onset voltage differential at said second cylinder pressure, said second breakdown onset voltage differential being substantially higher than said first breakdown onset voltage differential;

and wherein said method additionally comprises the additional step of:

adjusting said voltage differential supplied to said electrode gap from said power supply to be substantially equal to or greater than said first breakdown onset voltage differential and substantially less than said second breakdown onset voltage differential.

22. An apparatus for identifying a time during which a cylinder of an internal combustion engine is undergoing a compression stroke, according to claim 15, wherein said step of monitoring said voltage differential across said electrode gap comprises the steps of:

converting said voltage differential across said electrode gap to a substantially proportionally reduced voltage differential; and converting said substantially proportionally reduced voltage differential to a logical binary value.

23. An apparatus for identifying a time during which a cylinder of an internal combustion engine is undergoing a compression stroke, according to claim 15, wherein:

said internal combustion engine includes N cylinders; and said electrode gap is provided in and said voltage differential across said electrode gap is monitored in at least a plurality of said N cylinders.

24. An apparatus for identifying a time during which a cylinder of an internal combustion engine is undergoing a compression stroke, according to claim 15, wherein:

said internal combustion engine includes N cylinders; and said electrode gap is provided in and said voltage differential across said electrode gap is monitored in each of said plurality of said N cylinders.

25. An apparatus for identifying a time during which a cylinder of an internal combustion engine is undergoing a compression stroke, according to claim 14, wherein said power supply comprises a soft power supply.

26. An apparatus for identifying a time during which a cylinder of an internal combustion engine is undergoing a compression stroke, according to claim 14, wherein said power supply comprises a piezoelectric element.

* * * * *